Figure 1:
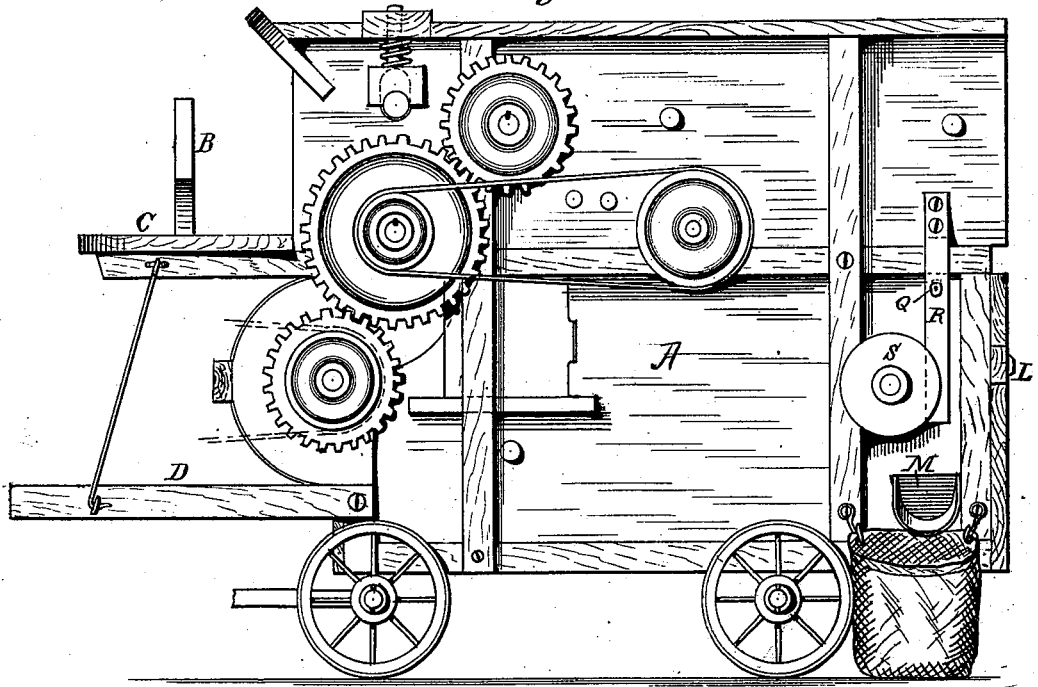

2 Sheets—Sheet 1.

M. C. SMITH.
Hop-Vine Stripper and Separator.

No. 197,744. Patented Dec. 4, 1877.

Attest:
H. L. Perrine
W. C. Chaffee

Inventor.
Moses C. Smith.
By Wm H. Fincke, Atty.

N. PETERS, PHOTO-LITHOGRAPHER, WASHINGTON, D. C.

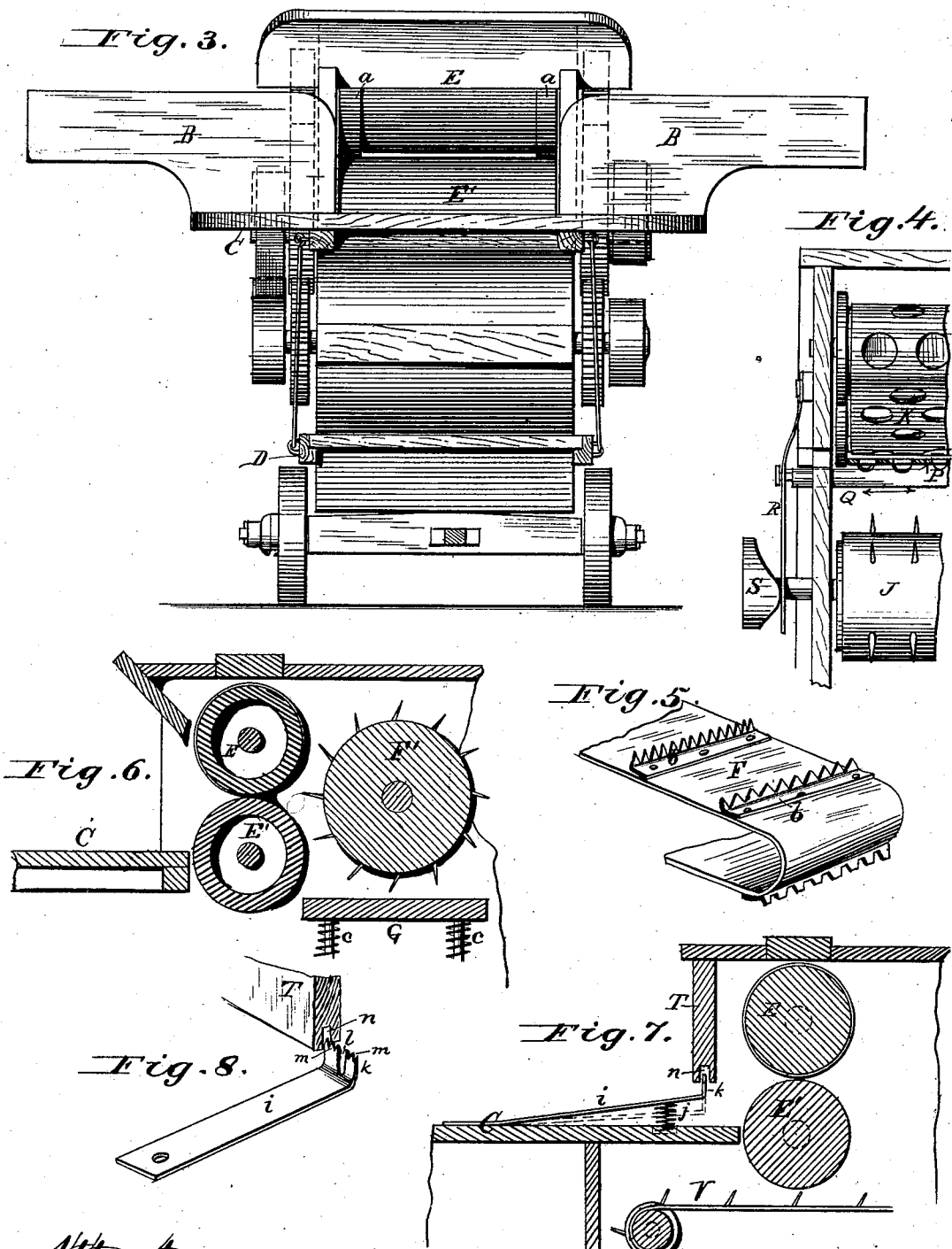

UNITED STATES PATENT OFFICE.

MOSES C. SMITH, OF STARKVILLE, NEW YORK.

IMPROVEMENT IN HOP-VINE STRIPPER AND SEPARATOR.

Specification forming part of Letters Patent No. 197,744, dated December 4, 1877; application filed October 18, 1877.

*To all whom it may concern:*

Be it known that I, MOSES C. SMITH, of Starkville, in the county of Herkimer, in the State of New York, have invented certain new and useful Improvements in Machines for Picking or Stripping Hops, of which the following is a full, clear, and exact description.

This invention is in the nature of an improvement in machinery for picking or stripping hops from their vines; for separating the hops from the vine-leaves; for separating or breaking up bunches or clusters, and for delivering the hops into bags ready for the kiln, the said machinery being portable, and designed for use in the field.

The invention consists in rolls of soft yielding material for feeding the vines to the stripping mechanism; of moving stripping-teeth disengaging the hops from the vines as they are fed forward, and carrying said vines forward; of a table beneath said moving teeth for receiving the vines from the feed-rolls, and made yielding, so as to avoid choking by accumulation of the vines; of a toothed revolving apron, operating in connection with a toothed bar, for delivering said hops into a chute, from which they are discharged into bags in condition for the drying-kiln, these several elements being combined as hereinafter claimed.

The invention further consists, in connection with the above-described or equivalent mechanism, in a fan located in the forward end of the machine; a fan-hood, the throat of which is guarded by a number of tongues depending from the yielding table before described, to prevent the escape of hops and leaves into the fan-casing; a perforated apron moving over rollers, and a shaker or sieve placed beneath the said apron, and over the toothed apron before described, whereby any hops and vine-leaves lodging in the throat or against the tongues are blown upward and upon the perforated apron, the hops falling through the perforations in said apron onto the sieve and through it onto the toothed apron, and by it delivered into the discharge-chute, the vine-leaves being discharged from the perforated apron along with the vines.

The invention also consists in a roll or rolls placed between the yielding table aforesaid and the perforated apron, over which the vines pass, and between which the hops fall onto the toothed apron.

The invention also consists in arms or rests secured to the frame of the machine, and projecting laterally therefrom at either side of the feed-opening, for the purpose of permitting the stacking of the hop-poles, with the vines thereon, in convenient reach of those feeding the machine.

The invention is susceptible of modifications, some of which are hereinafter specifically referred to and illustrated.

Figure 2:
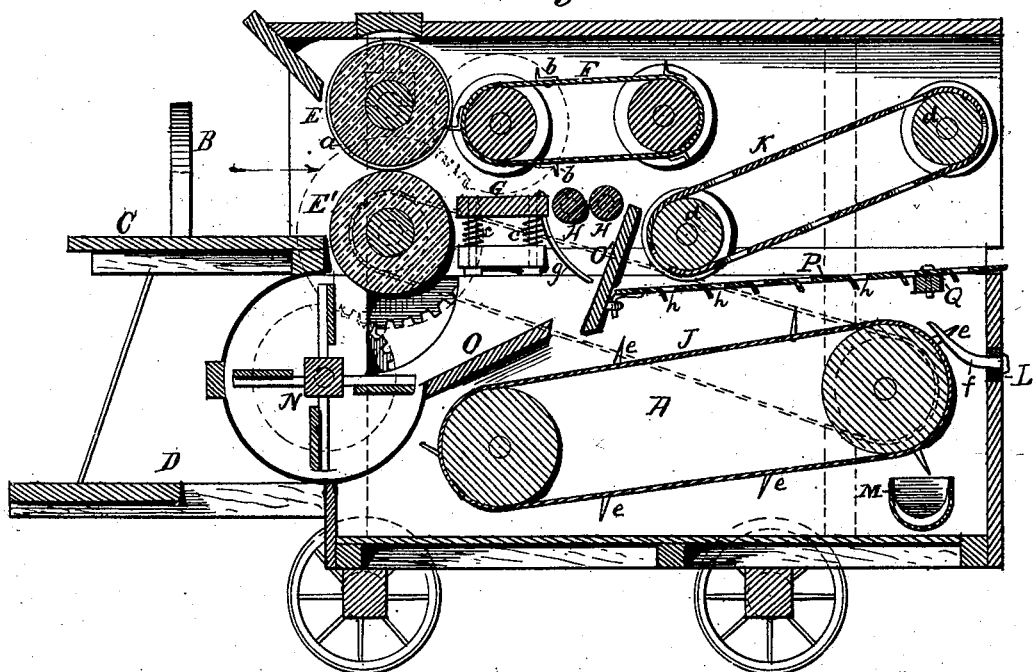

In the drawings, making part hereof, Figure 1 is a side elevation; Fig. 2, a longitudinal section. Fig. 3 is a front view; Fig. 4, a partial view of the rear; Fig. 5, a perspective view of the stripping mechanism; Fig. 6, a section showing a cylindrical stripper and hollow feed-rolls; Figs. 7 and 8, section and perspective of modified stripping mechanism.

In the gathering or picking of hops the vines are cut from the poles below the hops or clusters of flowers, the poles pulled with the vines on them, and the hops disengaged from the vines usually by manual labor, thereby involving the employment of many persons, much expense, and oftentimes an unremunerative crop, for the hands employed are not always careful in excluding leaves and branches of the vines in filling the boxes where they are paid by the box.

By my invention hop-picking is rendered much easier and less expensive, and better results are obtained.

The machinery, which is contained in a suitable frame, A, is mounted on wheels or otherwise rendered portable, and adapted to be drawn into the hop-field between the rows of vines, and is so placed that four men, two on each side, may work in severing the vines and placing them on their poles against the machine. I provide arms B B at the forward end of said machine, projecting outwardly from about midway of a table, C, against which arms these poles may rest in convenient reach of those standing upon a platform, D, whose duty it is to feed the vines to the machine for picking. On or about on a line with the upper surface of the table C are arranged two rolls, E E'. These rolls are made of rubber, hollow or otherwise, or of other material of such soft yielding nature as not to bruise the hops, but having such frictional surfaces as to be capable of drawing in the vines after the manner of feed-rolls. The upper roll may have, and preferably has, at its ends friction-bands *a a*, which rest upon the lower roll, to obtain motion from said lower roll for the upper roll, and at the same time serve to separate the two rolls sufficiently to admit the vines between them. The upper roll is housed in automatically-adjustable bearings, so as to accommodate various thicknesses of material being fed. Rearward of these rolls is arranged, upon revolving pulleys or drums, an endless apron, F, the surface of which is armed with serrated plates *b*, or other teeth or equivalent projections, that are adapted to strip the hops from the vines as they pass from the rolls E E'. Instead of this endless apron a toothed cylinder, F', (see Fig. 6,) may be employed. Beneath this apron or cylinder is arranged a table, G, provided beneath with springs *c c*, so as to yield to the pressure of the toothed apron or cylinder when the vines are matted or bulky. The vines are taken from this table by the toothed apron or cylinder as they come upon it from the feed-rolls, and the serrated plates *b* strip the hops from the vines, and, being carried along over the rolls H H—one or more of which may be employed—the hops drop through the interstices and fall upon a toothed carrier or apron, J, hereinafter described, while the leaves and vines are carried over upon a perforated apron, K, moving over revolving drums *d d*, and by it deposited beyond the machine. The apron or carrier J is also made to move over pulleys, and its surface is studded with rows of spikes or teeth *e e*, which catch any clusters or bunches of hops and carry them against teeth *f f* on a bar, L. The said clusters or bunches are broken or divided. The hops falling upon this apron are deposited by it in an inclined discharge-chute, M, which may be stationary, but is preferably so arranged as to be capable of receiving a vibratory motion, whereby the discharge of its contents is facilitated. This vibratory motion may be imparted by a cam and spring or other means. The mouth of this chute projects beyond the frame of the machine, and may there be provided with a suitable bag or other receptacle holder, as hooks or other devices, upon which a receptacle may be placed to receive the hops wherein they can be conveyed to the drying-kiln. (See Fig. 1.)

In the forward end of the machine is arranged a fan or other blower, N. The shaft of this fan may have applied to it gearing of such character as to receive horse or other motive power, and from this gearing the power may be transmitted to the other moving parts of the machine herein described, bands, pulleys, and pinions, or other ordinary and suitable connecting means being employed for this purpose. This fan is placed in a suitable hood or chamber, the end piece O of which is inclined from the bottom rearwardly. From the rear edge of the table G extend downwardly a number of tongues, *g g*, of wire or other material, the lower portions of which are curved rearwardly, and come nearly in contact with the piece or wall O' of the fan-hood. The piece or wall O' constitutes a throat for the fan-hood, and prevents the escape of leaves or pieces of hops into the fan-hood. The leaves, &c., lodge against the tongues *g*, and the blast from the fan traveling up the inclined end piece O drives said leaves, &c., upward over the partition-wall O', and upon the endless perforated apron or carrier K. The perforations in said apron K are of such size as to permit the passage through them of the hops or pieces of hops, but will not admit the vine-leaves, the latter being carried off by said apron, while the hops fall through the apron, as aforesaid, and are caught upon a shaker or vibrating sieve, P, arranged horizontally or otherwise beneath said apron K. This sieve is provided with holes smaller than those in the apron K, so as to further guard against the passage through it of any vine-leaves that may have been forced through the said apron.

The sieve may be constructed of sheet metal, and the holes punched through in semicircular form, the metal that is loosened in the operation being turned down, and the edges of the holes being rounded by the punching operation, whereby the escape of the hops is facilitated.

The tongue *h* of metal, turned down out of the holes in the sieve, may be so turned down, more or less, to the end that the size of the holes in said sieve may be varied.

The forward end of this shaker or sieve may be pivoted loosely, and its rear end attached to a bar, Q, which bar may be attached to a flat spring, R, arranged in contact with a cam, S, that will serve to impart an elastic jerking or shaking motion to the sieve. (See Figs. 1 and 4 for details of this construction.) But I do not limit myself to the use of this form of sieve, nor to this form of shaking mechanism, as sieves of other construction may be employed, and obvious mechanical expedients for oscillating the sieve described, and others may be used advantageously or with good effect.

Beneath this sieve is placed the endless toothed carrier J, before described, so that hops falling through the sieve are deposited upon this carrier, and delivered to the discharge-chute M.

In Figs. 7 and 8 is shown a modified form of stripping apparatus. A number of spring-fingers, *i*, of sheet metal, preferably, are arranged upon the table C, with one end nearly in contact with the feed-rolls E E'. These fingers are secured to the table at one end, say, by screws, and their other ends nearest the rolls are free, except that there are springs *j* interposed between them and the table, and secured to both, which springs and the inherent elasticity of the fingers serve to keep the free ends of the fingers elevated above the table. The extremities $k$ of the free ends of these fingers are turned up at right angles to the bodies, and a rounded notch, $l$, made in the center of each, on each side of which are serrations $m$. Above these fingers, and in line with their upturned extremities, is a bar, T, the lower edge of which is provided with a groove, $n$, into which the ends $k$ of the fingers normally extend. An apron, V, is arranged beneath these fingers.

The operation of this device is as follows: The fingers are pressed down one by one, and a vine placed in the notch of each, so as to permit the said vine to be engaged by the rolls E E'. The fingers are released and enter partially into the groove $n$. Now, the rolls being set in motion, they draw in the vines, and, the notch $n$ being only sufficiently large to admit of the passage of the vine, it follows that as the vine is advanced the hops will be stripped off by their coming into contact with the notched and serrated end $k$ and the edge of the bar T, and the hops so stripped fall down through the table upon the belt or apron beneath it, and are carried by it back to the sieve and the delivery-apron. The perforated apron K may be extended forward to serve the purposes of this apron V.

With this machine the work of twenty or more hands can be readily performed by means of five or six, and the work will be more satisfactorily and expeditiously done.

What I claim is—

1. The combination of feed-rolls, a yielding receiving-table, and a toothed stripper, substantially as set forth.

2. The combination of feed-rolls, a toothed stripper, a receiving-table, and one or more conducting or bearing rolls, the parts being so arranged that the stripper serves also to draw the vines over the rolls, substantially as set forth.

3. The combination of a pair of feed-rolls, a toothed stripper, a receiving-table, one or more conducting-rolls, and a perforated carrier-belt, said stripper being arranged to conduct the vines from the feed-rolls to the carrier-belt, and the rolls and carrier-belt being arranged at proper intervals to allow the hops to drop through while retaining the vines, substantially as set forth.

4. The tongues $g$, secured to table G or elsewhere, and projecting beneath the rolls H H into the air-passage formed by the deflecting wall O and the sides of the casing of the machine, substantially as and for the purpose specified.

5. The combination of the toothed endless conveying-belt J and the bar L, provided with clearing-teeth, substantially as described.

6. The arms or rests B, secured to the frame of the machine, and projecting laterally therefrom at either side of the feed-opening, substantially as and for the purpose set forth.

The above specification of my invention signed by me this 13th day of October, A. D. 1877.

MOSES C. SMITH.

Witnesses:
  GEO. F. GRAHAM,
  WM. H. FINCKEL.